US007596715B2

(12) United States Patent  (10) Patent No.: US 7,596,715 B2
Di Cristofano  (45) Date of Patent: Sep. 29, 2009

(54) COMPUTER SERVER WITH BUILT-IN MODULAR NETWORKING COMPONENT

(76) Inventor: Carlo Leonardo Di Cristofano, 1424 N. Lee Blvd., Chicago, IL (US) 60163

( * ) Notice: Subject to any disclaimer, the term of this patent is extended or adjusted under 35 U.S.C. 154(b) by 236 days.

(21) Appl. No.: 11/467,369

(22) Filed: Aug. 25, 2006

(65) Prior Publication Data

US 2007/0061435 A1  Mar. 15, 2007

Related U.S. Application Data

(60) Provisional application No. 60/715,700, filed on Sep. 9, 2005.

(51) Int. Cl.
*G06F 11/00* (2006.01)
(52) U.S. Cl. .................. 714/14; 714/4; 714/43
(58) Field of Classification Search .............. 714/2, 714/4, 14, 22, 43; 709/203, 223
See application file for complete search history.

(56) References Cited

U.S. PATENT DOCUMENTS

| 4,881,230 | A * | 11/1989 | Clark et al. ............. 714/4 |
| 6,175,490 | B1 * | 1/2001 | Papa et al. ............. 361/686 |
| 6,823,475 | B1 * | 11/2004 | Harker ................... 714/14 |
| 6,871,300 | B1 * | 3/2005 | Irving ..................... 714/4 |
| 6,985,967 | B1 * | 1/2006 | Hipp ..................... 709/250 |
| 7,124,321 | B2 * | 10/2006 | Garnett et al. ............ 714/14 |
| 7,174,375 | B2 * | 2/2007 | King et al. ............. 709/223 |
| 7,287,187 | B2 * | 10/2007 | Williams et al. .......... 714/14 |
| 7,313,717 | B2 * | 12/2007 | Vecoven et al. ........... 714/4 |
| 7,395,323 | B2 * | 7/2008 | Larson et al. ........... 709/223 |
| 7,418,525 | B2 * | 8/2008 | Dalton et al. ............ 714/4 |
| 2005/0091304 | A1 * | 4/2005 | Trayler ................. 709/200 |
| 2006/0242462 | A1 * | 10/2006 | Kasprzak et al. .......... 714/22 |

* cited by examiner

*Primary Examiner*—Robert Beausoliel
*Assistant Examiner*—Joseph D Manoskey
(74) *Attorney, Agent, or Firm*—Senniger Powers LLP

(57) ABSTRACT

A network-configured computing device providing services to one or more other computing devices. A circuit board contained within a housing of the computing device includes a plurality of interfaces for coupling one or more devices therewith. Processing units mounted on the circuit board provide services to the network-configured computing devices. A memory device connects to the circuit board, and a primary power source is coupled to the processing units for supplying power thereto. A cooling device positioned within the housing reduces heat generated during operation of the network-configured computing device. A modular network interface connection device positions within the housing and operatively connects to at least one processing unit via a circuit board interface. A modular network router device positions within the housing and operatively connects to the modular network interface connection device. A power extension cord connects to the primary power source for supplying power to the modular network devices.

16 Claims, 2 Drawing Sheets

COMPUTER SERVER WITH BUILT-IN MODULAR NETWORKING COMPONENT

CROSS-REFERENCE TO RELATED APPLICATIONS

This application is a non-provisional of U.S. Provisional Patent Application Ser. No. 60/715,700, filed Sep. 9, 2005, the entire text of which is hereby incorporated by reference.

BACKGROUND

With demands in processing powers, businesses rely on computer servers to handle ever-increasing electronic transactions. From online stores to processing of server applications, computer servers are built with increasing processing capabilities.

Often, computer servers are connected to other computing devices via external, third-party networking components. These networking components, such as routers, switches, hubs, etc., connect computer servers to other computing devices via common communication networks. In a typical existing computer network setting, networking components are externally connected to a server via network cables or through wireless means. Even with a wireless connection, however, users frequently need to find a rack or a place to connect the wireless router or a wireless hub to a wired internet connection from a wall outlet. Unfortunately, current network design only attempts to optimize processing power and memory storage coupled to the server's processing units.

For example, FIG. 1 illustrates an existing computer network environment. Suppose a small business owner wishes to establish an online web site for a business having a number of workstations 108. In order to set up its own web server, the business needs to purchase a suitable high-speed internet connection from an internet service provider and an appropriate modem 110. A computer server 102 and various networking devices, such as a router 104, a hub 106, a switch, etc., must be connected externally. In addition, before the server 102 can host the web site, the business often need professional assistance in connecting these devices together, which adds cost, hassle and ongoing technical support to the process. If possible, the small business owner also places the computer server 102 in a separate server room 112 with a dedicated cooling device 114 for maintaining proper operating temperature of the computer server 102.

In another example, suppose another small business owner wishes to establish a small office network using a server and a number of workstation computers. In addition to all of the cables connecting the workstation computers and the server, the small business owner needs to find a proper location to place the networking equipment and a room (e.g., server room 112) with proper cooling to position the server.

SUMMARY OF THE INVENTION

Embodiments of the invention include a computer server tower with built-in modular networking devices. Embodiments of the invention overcome the shortfalls of previous designs by modularizing networking devices in a self-contained computer server tower. As such, the user no longer needs to deal with wires or cables (e.g., category "CAT" 5 wires) or manage such cables (e.g., determining the best length of cables without worrying about whether the cables will be a few inches too short or a few feet too long) in connecting networking devices to the computer server tower. In addition, the user no longer needs to be bothered with server rack mount cases or other organizational casing to neatly organize the server and the networking devices.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
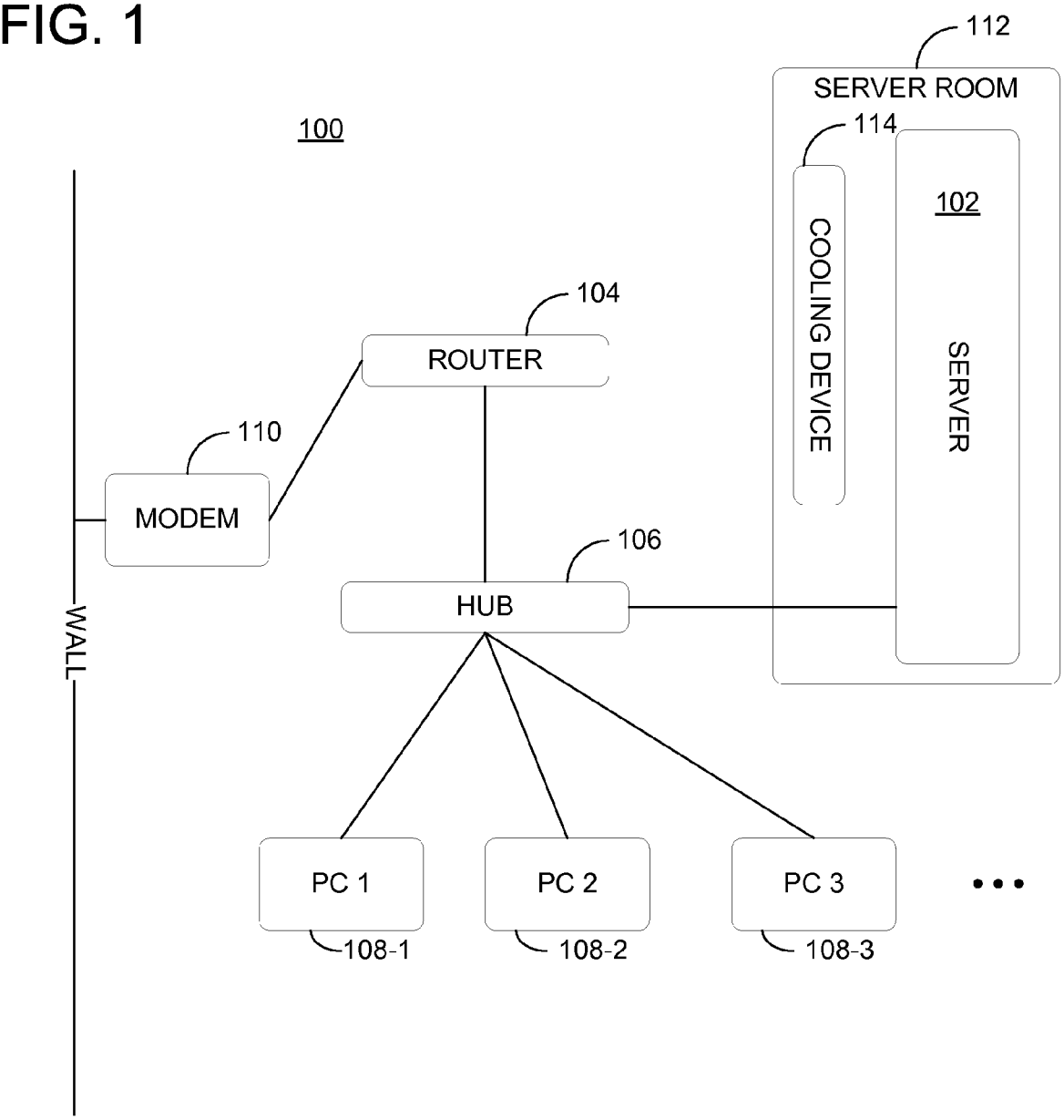
FIG. 1 is a block diagram illustrating an exemplary configuration for establishing a computing network with a server and one or more clients according to prior art.
Figure 2:
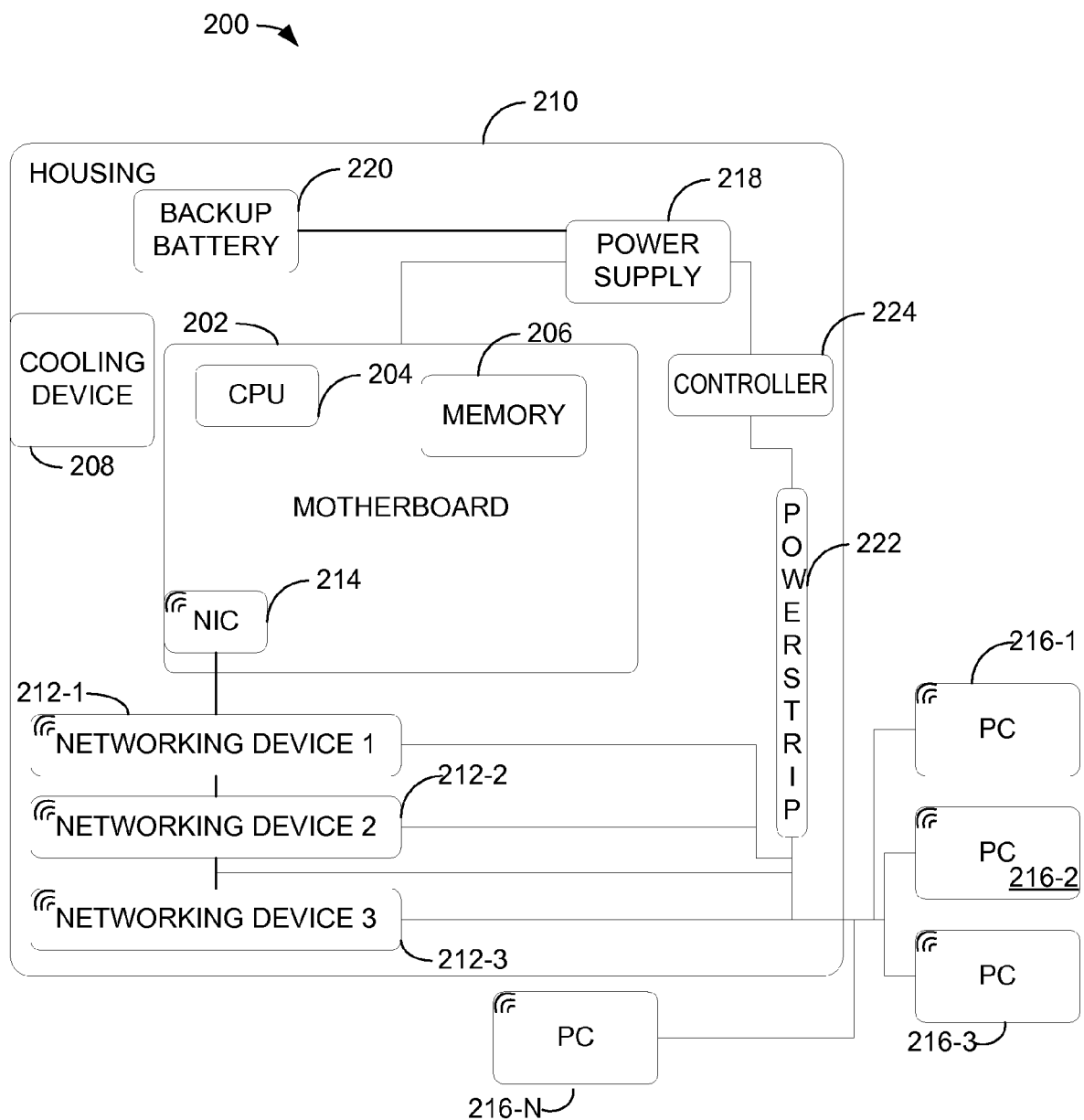
FIG. 2 is an exemplary embodiment of a computer server system with built-in modular networking devices.

As shown in FIG. 2, a computer server unit 200 includes at least devices or components listed below in one unit. In addition, the computer server unit 200 is scalable and may include additional products that are not shown in FIG. 2. The computer server unit 200 includes a circuit board 202, such as one or more motherboards or circuit boards that support at least one processing unit 204. For example, the circuit board 202 may support up to as many as eight 32-bit or 64-bit architecture processing units made by various chip makers, such as Intel®, AMD®, IBM®, Motorola® or other manufacturers. Other brands of central processing units, SCSI, RAID CONTROLLERS or processing devices may be used.

The computer server unit 200 also includes a memory 206, including a random access memory (RAM) with suitable (e.g., up to 8 gigabytes) memory storage capacity. Additional memory with higher storage capacity may be used to accommodate the current or future needs or standards, provided that a cooling device 208 is sufficient to provide the needed cooling for the proper operation of the devices in a housing 210. The memory 206 may include at least some form of computer readable media. Computer readable media, which include both volatile and nonvolatile media, removable and non-removable media, may be any available medium that may be accessed by the computer server unit 200. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by the computer server unit 200. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

As shown in FIG. 2, the housing 210 of computer server unit 200 encloses one or more modular networking devices 212. In one example, the housing 210 may be constructed of suitable and lightweight materials, such as aluminum, graphite, alloy of metals, a combination thereof, or other known materials for creating the housing 202. In another example, the housing 202 may be made of metallic compounds, such as aluminum, or other metallic compositions, or other compounds so as to be proficient in heat dissipation. The modular network devices 212 may include a router, a hardware firewall device, a network hub, a network switch, and other networking components that are familiar to one skilled in the art. It is to be noted that these modular network devices 212 are internal to the housing 210 and not external such that the user does not need to purchase external equipment to set up the computer server unit 200 to a common communication network, such as an internet or intranet, or to other devices (e.g., a computing device) 216. In one embodiment, the modular network devices 212 are coupled with a network interface card or a network interface connection 214 and the network interface connection 214 is coupled to the circuit board 202.

The computer server unit 200 may also include SCSI devices, hard disk drives, D-ROM drives, CD-ROM burners, digital linear tape devices (DLT), tape drives, DVD-ROM drives, and other SCSI supported devices (not shown).

The computer server unit 200 further includes a power supply 205 which may support up to eight hot-swappable 550 watt or higher wattage power supply. For example, the power supply 218 provides electrical power to the circuit board 202, the processing unit 204, the modular networking devices 212, the cooling device 208, and other components associated with the computer server unit 200. Moreover, the power supply 218 may further include transformers for properly distributing power from a wall outlet to the various components within the housing 210.

In one embodiment, the computer server unit 200 provides power outlets via a power strip or a power extension cord 222 for connecting the modular networking devices 212. For example, the modular networking devices 212 (e.g., modular network hub device, modular router device, modular switch device, or the like) receive electrical power from the power supply 218 via the power strip 222. In another embodiment, the computer server unit 200 also includes a controller 224 for regulating the power supplied by the power supply 218. The controller 224 determines the power output to be consumed by each of the modular networking devices 212. In an alternative embodiment, the controller 224 may include one or more components (e.g., diodes) that may be installed on the circuit board 202 for regulating and managing power consumption by the modular networking devices 212. A backup battery 220 further provides the needed power to the power supply 218 for a temporary amount of time (e.g., 10 to 20 minutes) in the event of power failure. In one embodiment, the duration and the power output of the backup battery 220 may depend on the actual number of the modular networking devices 212.

In yet another embodiment, the modular networking devices 212 are connected to the circuit board 202 of the computer server unit 200 via the network interface connection 214 as independent units to the extent that the consumer can interchange the router, hub, switch, etc., without any type proprietary hardware. By being able to switch or add various modular networking devices 212, the computer server unit 200 is scalable and flexible to meet the needs of its user without purchasing additional wired connectors. The modular networking devices 212 can be connected in the same way as if they were to be utilized externally. Each independent module is shielded to provide performance substantially free from electromagnetic interference. In addition, the wires from the power supply to the circuit board 202, CD-ROM, DVD, CD-RW, floppy drive, zip disk drive, or hard drives that require a power source to operate may be fully shielded by known techniques to prevent any type of unwanted interferences.

In accordance with aspects of the present invention, the computer server unit 200 further includes an internal cooling device 208 to maintain proper cooling, unlike conventional server racks in which dedicated air ducts or room-sized cooling systems are required to provide sufficient cooling of computer servers. When improperly cooled, the servers may be subjected to service down time. Advantageously, the present invention eliminates the server closet rack or cooling air ducts, which may be costly, by providing the internal cooling device 208. The cooling device 208 may also include filtered blower and exhaust fans (not shown) to prevent dust build-up and to reduce dust from entering the computer server unit 200 and, thus, help prevent the accumulation of dust from reducing the life expectancies of the internal hardware components and help improve the circulation of airflow.

In one example, the modular networking devices 212 may be wirelessly connected to each other and/or other personal computers 216. In such example, FCC proprietary frequencies allow interference-free connections within the computer server unit 200. As such, aspects of the invention eliminate the hassle of knowing where to optimally place hubs, routers, switches, Wireless WiFi, battery backup, and outlet strips, surges protectors, etc. The various components may be modularly incorporated in the housing 210 of the computer server unit 200 and fully shielded between each modular networking device 212 to prevent any type of undesired interference between the circuit board 202, other electric components, and the modular networking devices 212. For example, the shielding consists of high content foil to prevent internal circuitry interference. In an alternative embodiment, other shielding material may be used to also act as a heat shield to reduce and maintain proper operating temperature of the modular networking devices 212, the circuit board 202, the processing unit 204, the memory device 206, and/or other components within the housing 210.

As such, the computer server unit 200 provides a self-contained server unit within a single housing that includes a predetermined set of components that would be mounted externally to the walls or rack units in the prior art. Embodiments of the invention provide the convenience to the user who can simply plug the computer server unit 200 to the common communication network (e.g., the source line of a digital subscriber line (DSL) or a cable internet connection) from the wall. Thus, the computer server unit 200 saves money, provides efficient space organization, reduces maintenance or setup time or cost, and/or eliminates the need to purchase external networking devices.

In operation, a user may practice embodiments of the invention by implementing a networked environment based on the description above. For example, the user may sign up with an internet service provider (ISP) for establishing an internet connection via either a digital subscriber line (DSL) or a data cable connection. This internet connection usually comes with an appropriate modem (e.g., either a DSL modem or a cable modem) for transforming data from the ISP to a form to be used by a computing device (e.g., computer server unit 200). The user next installs a system including a server computing device, which comprises a housing and a circuit board positioned within the housing. The circuit board (e.g., a motherboard) includes a plurality of interfaces for coupling one or more devices therewith. The circuit board also includes one or more processing units mounted thereon, and a memory device is connected to the circuit board and is accessible by at least one of the processing units. A primary power source is coupled to the processing units for supplying power thereto, and the server computing device includes a cooling device positioned within the housing for reducing heat generated during operation of the computing device.

The user may connect a CAT 5 cable from the modem (e.g., either a DSL or cable modem) to a modular network interface connection device positioned within the housing and operatively connected to at least one of the processing units via a first one of the circuit board interfaces. The modular network interface connection device is further connected to or coupled to a modular network router device, which is also positioned within the housing and operatively is connected to at least one of the processing units via said modular network interface connection device. The server computing device also includes a power extension cord coupled to the primary power source for supplying power to the modular network router device. In one embodiment, the server computing device further includes a back-up power source coupled to the primary power source for providing power to the processing units in response to a failure of the primary power source.

In another embodiment, the server computing device includes a modular network hub device that is positioned within the housing and is operatively (wired or wireless) connected to the modular network interface connection device and/or the modular network router device. With such setup, the user may connect, wired or wirelessly, one or more client computing devices to the modular network interface connection device or the modular network hub device such that the one or more client computing devices is configured in the network environment and the server computing device provides service to the one or more client computing devices.

The order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of embodiments of the invention, it is intended that all matter contained in the above description and shown in the accompanying drawings shall be interpreted as illustrative and not in a limiting sense.

What is claimed is:

1. A network-configured computing device for providing services to one or more other computing devices, said network-configured computing device comprising:

a housing;

a circuit board positioned within the housing, said circuit board including a plurality of interfaces for coupling one or more devices therewith;

one or more processing units mounted on the circuit board for providing services to the network-configured computing devices;

a memory device connected to the circuit board and accessible by at least one of the processing units;

a primary power source coupled to the processing units for supplying power thereto;

an air-conditioning cooling device positioned within the housing for reducing heat generated during operation of the computing device;

a modular network interface connection device positioned within the housing and operatively connected to at least one of the processing units via a first one of the circuit board interfaces, wherein said modular network interface connection device establishes a network connection from a network service provider;

a modular network router device positioned within the housing and operatively connected to at least one of the processing units via said modular network interface connection device;

a modular network hub device positioned within the housing and operatively connected to the modular network router device, said modular network hub device further provides one or more connection ports to connect to the one or more other computing devices, wherein said hardware modular network hub connects to the one or more other computing devices without connecting to the modular network interface connection device, wherein the one or more processing units transfer data packets among the modular network interface connection device, the modular network router device, and the modular network hub device so that the one or more other computing devices can access the established network connection from the network service provider via the modular network hub device;

a power extension cord coupled to the primary power source for supplying power to the modular network router device; and a back-up power source coupled to the primary power source for providing power to the processing units in response to a failure of the primary power source.

2. The computing device of claim 1, wherein the modular network hub device is configured to connect with the the modular network interface connection device.

3. The computing device of claim 2, wherein the modular network interface connection device wirelessly connects to the first one of the circuit board interfaces, and wherein the modular network hub device and modular network router device wirelessly connect to the modular network interface connection device.

4. The computing device of claim 2, further comprising shielding means for shielding the modular network interface connection device, the modular network router device, and the modular network hub device from electromagnetic interference.

5. The computing device of claim 4, wherein the primary power source supplies power to the cooling device.

6. The computing device of claim 1, further comprising a controller for regulating the power supplied by the primary power source.

7. The computing device of claim 6, wherein the controller provides a predetermined amount of electrical power for operating the modular network hub device and the modular network router device when connected to the power source via the power extension cord.

8. The computing device of claim 1, wherein the modular network interface connection device connects to the first one of the circuit board interfaces via a proprietary interface, and wherein the modular network hub device and modular network router device connect to the modular network interface connection device via the proprietary interface.

9. A system for providing a networked environment, said system comprising:
 a server computing device comprising:
  a housing;
  a circuit board positioned within the housing, said circuit board including a plurality of interfaces for coupling one or more devices therewith;
  one or more processing units mounted on the circuit board;
  a memory device connected to the circuit board and accessible by at least one of the processing units;
  a primary power source coupled to the processing units for supplying power thereto;
  an air-conditioning cooling device positioned within the housing for reducing heat generated during operation of the computing device;
  a modular network interface connection device positioned within the housing and operatively connected to at least one of the processing units via a first one of the circuit board interfaces, wherein said modular network interface connection device establishes a network connection from a network service provider;
  a modular network router device positioned within the housing and operatively connected to at least one of the processing units via said modular network interface connection device;
  a modular network hub device positioned within the housing and operatively connected to the modular network router device, said modular network hub device further provides one or more connection ports to connect to the one or more other computing devices, wherein said hardware modular network hub connects to one or more other computing devices without connecting to the modular network interface connection device;
  a power extension cord coupled to the primary power source for supplying power to the modular network router device and the modular network hub device; and
  a back-up power source coupled to the primary power source for providing power to the processing units in response to a failure of the primary power source, and
 one or more client computing devices connected to the modular network hub device such that the one or more client computing devices is configured in the network environment and wherein the one or more processing units in the server computing device transfer data packets among the modular network interface connection device, the modular network router device, and the modular network hub device so that the one or more other computing devices can access the established network connection from the network service provider via the modular network hub device.

10. The system of claim 9, wherein the modular network hub device is operatively connected to the modular network interface connection device.

11. The system of claim 10, wherein the modular network interface connection device wirelessly connects to the first one of the circuit board interfaces, and wherein the modular network hub device and modular network router device wirelessly connect to the modular network interface connection device.

12. The system of claim 10, wherein the server computing device is further configured to include shielding means for shielding the modular network interface connection device, the modular network router device, and the modular network hub device from electromagnetic interference.

13. The system of claim 12, wherein the primary power source supplies power to the cooling device.

14. The system of claim 9, wherein the server computing device is further configured to include a controller for regulating the power supplied by the primary power source.

15. The system of claim 14, wherein the controller provides a predetermined amount of electrical power for operating the modular network hub device and the modular network router device when connected to the power source via the power extension cord.

16. The system of claim 9, wherein the modular network interface connection device connects to the first one of the circuit board interfaces via a proprietary interface, and wherein the modular network hub device and modular network router device connect to the modular network interface connection device via the proprietary interface.

* * * * *